Patented Dec. 1, 1953

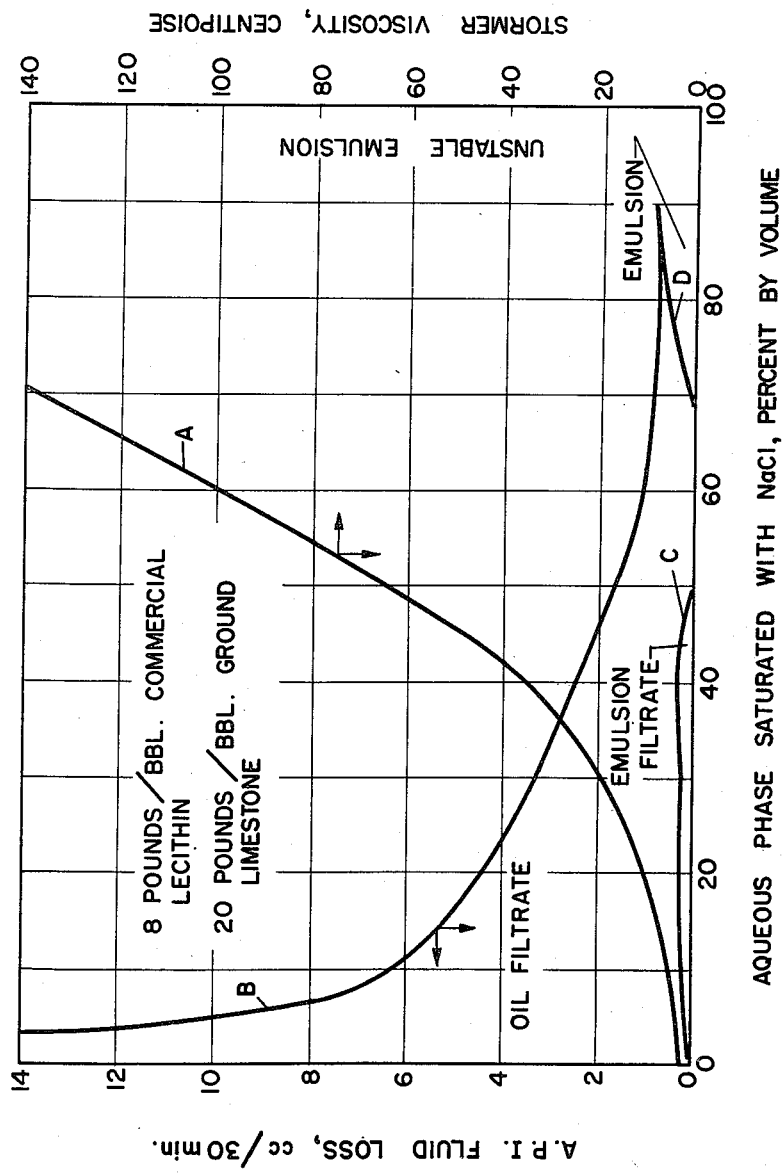

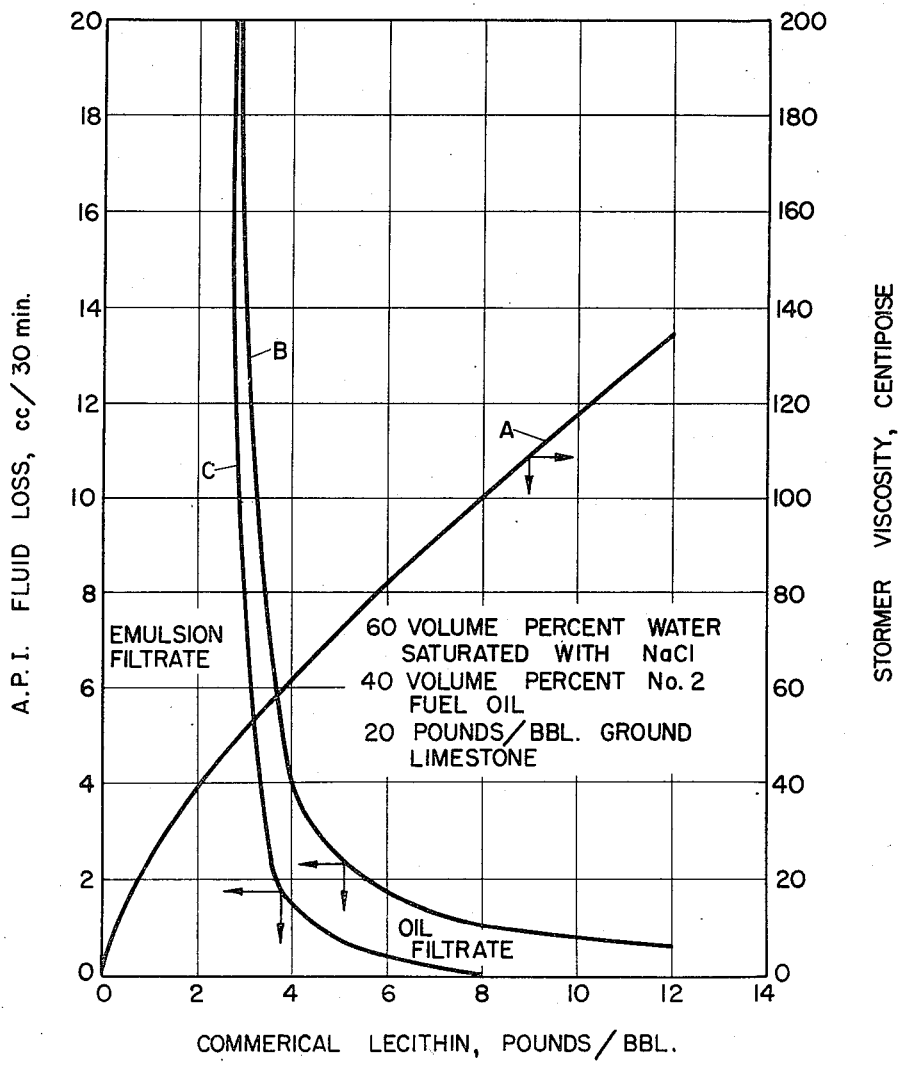

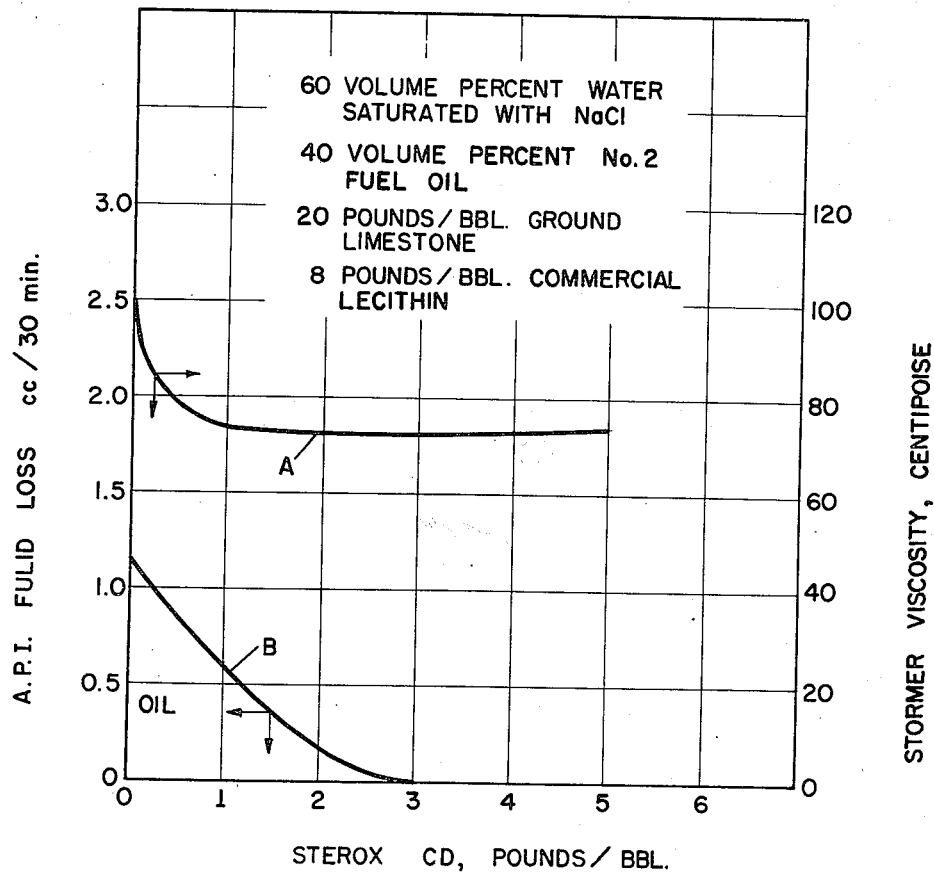

2,661,334

UNITED STATES PATENT OFFICE 2,661,334

WATER-IN-OIL EMULSION DRILLING FLUID

James Lawson Lummus, Tulsa, Okla., assignor to Stanolind Oil and Gas Company, Tulsa, Okla., a corporation of Delaware Application February 11, 1952, Serial No. 270,941

16 Claims. (Cl. 252—8.5)

This invention relates to drilling fluids. More particularly, it relates to emulsion drilling fluids for use in well-completion or other well-servicing work to avoid water-contamination of the producing formation.

In many areas, wells drilled with aqueous drilling fluids suffer serious decreases in permeability of oil-bearing zones as a result of water blocking of pore space, and swelling of anhydrous clays within the pore spaces. These water-contamination difficulties can be avoided by the use of an oil, such as a crude petroleum oil, as a drilling fluid. Most oils, however, lack many of the qualities necessary in a drilling fluid. For example, most crude petroleum oils are of low density, are inflammable, are readily lost to the permeable formations, and lack the required viscosity and gel strength properly to suspend weighting materials and other solids. Numerous means have been proposed for overcoming these defects. These means usually involve adding materials such as blown asphalt or other finely divided solids to the oil to increase the density, viscosity and gel strength, and to give the fluid plastering properties to decrease loss of the fluid to permeable formations. The resulting fluids are generally very disagreeable to handle because of additives such as asphalt, require heat for mixing, do not have sufficient viscosity and gel strength properly to suspend weighting materials and other solids either when the drilling fluid is in motion or static. These treated oils also are generally indistinguishable from oil in the formation, making detection of original oil saturation in cores difficult. Various properties, such as viscosity, of the treated oils are difficult to control, particularly upon contamination of the oil by water from formations drilled or by surface water. As a result, efforts have been made to develop drilling fluids which do not cause water-contamination of formations drilled, but which are not subject to the objections to oil-base drilling fluids.

Oil-in-water emulsion drilling fluids solve most of the problems encountered in oil-base drilling fluids, but since water is the continuous phase, the formations are not protected from the water, and shale bit cuttings are continually hydrated by the muds, requiring constant dilution and addition of treating chemicals to the emulsions.

Recently, efforts have been made to obtain the benefits of oil-base muds without the usual difficulties, by preparing water-in-oil emulsion drilling fluids. The principal difficulty with these materials has been their high degree of instability, sometimes to the extent that inversion of the emulsion occurs upon contamination by water or even upon dilution by oil. In addition, even the more stable water-in-oil emulsion drilling fluids have been found to produce unstable emulsion filtrates when forced through porous media. These unstable filtrates break into separate water and oil phases; the water then being free to hydrate shales in the formation. In order to form stable water-in-oil emulsion drilling fluids, oil has usually been made the major constituent by a considerable percentage. This leads to the same troubles with density, fluid loss, inflammability, gel strength and viscosity met with when oil-base drilling fluids are employed.

An object of this invention is to provide a stable water-in-oil emulsion, well-drilling or well-completion fluid to protect the formation and bit cuttings from hydration by water.

Another object of the invention is to provide a stable water-in-oil emulsion drilling fluid which will withstand contamination by large amounts of water.

An additional object of my invention is to prepare a stable water-in-oil emulsion drilling fluid having desirable properties of fluid loss, viscosity and density.

Still another object of this invention is the preparation of a stable water-in-oil emulsion drilling fluid which is non-inflammable, inexpensive, and unobjectionable to handle.

A further object of the invention is the provision of a stable water-in-oil emulsion drilling fluid which produces a filtrate, when forced through porous media, which is preferably pure oil, or if an emulsion, is a stable water-in-oil emulsion which is easily distinguishable from true formation oil.

A still further object of my invention is to provide a method of drilling or completing a well in which a drilling fluid is circulated comprising a stable water-in-oil emulsion with desirable properties.

Another object of the invention is to devise a method of treating contaminated water-in-oil emulsion drilling fluids containing oil-soluble, non-ionic, surface-active agents as emulsifiers.

In general, I accomplish the objects of my invention by forming an emulsion of water in oil employing a non-ionic, oil-soluble, surface-active agent as the emulsifier, and stabilizing this emulsion by the addition of a non-ionic, water-soluble, surface-active agent.

For example, an emulsion drilling fluid of 60 parts by volume of water saturated with NaCl and 40 parts by volume of No. 2 fuel oil can be prepared by use of 8 pounds per barrel of commercial lecithin. The emulsion is further stabilized, and plastering properties are imparted to the drilling fluid by the addition of 20 pounds per barrel of ground limestone. This primary emulsion is of the water-in-oil type and can be used as a drilling fluid, but it is sensitive to contamination by water, tending to become unstable and invert. It is also sensitive to contamination by large amounts of solids, becoming very viscous and plastic. When once contaminated, dilution by further fuel oil, or the addition of the viscosity reducers normally effective in water-base muds does not reduce the viscosity or restore the stability of the emulsion.

I have found that primary emulsions of this type can be stabilized and their viscosity reduced, by adding about three pounds of a water-soluble, non-ionic, surface-active agent such as Sterox CD, a polyoxyethylene ester, per barrel of emulsion. Further reduction in viscosity can then be achieved by dilution with fuel oil. Preferably, additional oil-soluble emulsifier should be added in this case to maintain the proper emulsifier concentration.

A preferable procedure is to add the water-soluble, non-ionic, surface-active agent before contamination occurs. If this is done, a water-in-oil emulsion drilling fluid results which has a fluid loss of almost zero by the standard A. P. I. test, and the small amount of filtrate produced is all oil. The emulsion is stable to contamination by water, solids, and oil. The drilling fluid has a density of about 9 pounds per gallon and the aqueous phase can be easily weighted to obtain higher densities. The viscosity is high enough to carry bit cuttings out of the well, and a small gel strength develops on standing. Due to the large amount of water, the emulsion is non-inflammable even when a light hydrocarbon or crude oil is employed as the oil phase. Since the oil phase is not the major constituent and contains no added asphalt or other objectionable materials, the drilling fluid is clean, light colored and not sticky or otherwise objectionable to handle.

In drilling operations, very little loss of fluids to the formations drilled occurs due to the extremely low filtrate loss. The small amount of fluid lost is pure, non-viscous oil which cannot harm the producing formations and is generally easily distinguished from virgin crudes in cores. Bit cuttings contact the continuous oil phase first and are not hydrated. The cuttings are carried to the surface in an unhydrated state and are separated on the shale shaker or in the mud pits or tanks. Thus, dilution and continuous treating of the drilling fluid usually are not necessary.

The ingredients of the emulsion drilling fluid may be added in any order, and an operable composition will result. A superior composition will be produced, however, if a certain procedure is followed. The oil-soluble emulsifier is first dissolved in the oil. The resulting oil should then be mixed with an approximately equal volume of the water phase in which the salt has been dissolved. The water-soluble emulsifier should not, for best results, be mixed into the water before formation of the primary emulsion. The remaining water, if any, should then be added slowly with mixing. Any ground solids may thereafter be added to complete the formation of a primary emulsion drilling fluid operable in itself but subject to contamination difficulties. The fluid is then completely stabilized by adding the water-soluble emulsifier.

The advantage of this procedure over one in which the water-soluble emulsifier is dissolved in the water before the water is emulsified with the oil, is that a higher viscosity is produced, apparently due to a more finely divided water phase. The reason for the behavior is not well understood, but one possible explanation is that it makes a difference whether the water-soluble emulsifier approaches the interface from the oil side or the water side. If the water-soluble emulsifier is added after the emulsion is formed, the water-soluble material must approach the interface from the oil side and penetrate the layer of oil-soluble emulsifier at the interface. An opportunity for more effective cooperation with the oil-soluble emulsifier is thus afforded than if the water-soluble material approached from the water side of the interface. It will be apparent that the water-soluble emulsifier must be at least slightly oil-soluble or oil-dispersible to penetrate the oil phase. This is a general characteristic of non-ionic, water-soluble, surface-active agents which is not true of most of the ionic materials.

Although specific materials and concentrations are named above, it has been found that some latitude is possible with respect thereto. The effects of some of these variations are shown in the accompanying graphs:

Figure 1 illustrates in the form of curves, the variation of the properties of the primary lecithin emulsions with changes in water-to-oil ratio.

Figure 2 is another set of curves demonstrating the variations in properties of primary lecithin emulsions with changes in lecithin content.

Figure 3 shows the effects of adding a water-soluble, non-ionic, surface-active agent, Sterox CD, to a primary lecithin emulsion.

In order to demonstrate my invention more fully, a detailed description thereof appears below wherein the more important features are separately discussed.

*Water phase*

The water phase should be present in an amount equal to from about 40 to about 75 per cent by volume of the emulsion. The lower limit of water concentration is governed principally by density and viscosity considerations. If less than 40 per cent of the water phase is employed, the density of the emulsion is controlled principally by the oil phase, and addition of weighting materials to the aqueous phase does not greatly affect the density of the overall emulsion. When the volume of the continuous phase exceeds that of the dispersed phase, the viscosity of the emulsion is rather low. More suitable viscosities can be obtained by use of higher concentrations of the dispersed phase. Thus, in the majority of instances, the emulsion should contain a minimum of about 40 volume per cent water and not more than about 60 volume per cent oil.

The upper water-phase limit of 75 per cent by volume is controlled principally by viscosity considerations, the possibility of water contamination and the loss of oil filtrate. It is well known that when the dispersed phase of an emulsion becomes very much larger than the continuous phase, a considerable increase in viscosity results. When the water content of a water-in-oil emulsion exceeds 75 per cent, by volume, the viscosity becomes higher than is normally desirable in drilling fluids. Since this water phase in my emulsion may contain thickening and weighting agents, the viscosity may be even higher. Emulsions containing 75 per cent water have been found to be usable. Those containing even more water can be employed as drilling fluids but allowance must be made for possible further contamination with water and for loss of the oil phase in the filtrate. For these reasons, an upper water phase limit of 75 per cent should not be exceeded in preparing an emulsion according to my invention.

Although a water phase range of 40 to 75 per cent by volume can be used, certain portions of this range of concentrations will result in a mud which will give an emulsion filtrate as illustrated in Figure 1. In this figure, curve A shows the variation of viscosity of an emulsion drilling fluid with variation in the volume per cent of the emulsion represented by the aqueous phase. All constituents of the emulsion are indicated with the exception of the oil phase. No. 2 fuel oil was employed as the oil phase. Curves B, C and D all refer to filtrate rate. Curve B indicates total filtrate. Curves C and D show the amount of this filtrate which is an emulsion. For example, when using 40 per cent aqueous phase and 60 per cent oil, the filtrate amounts to about 2.5 cc./30 min. Of this filtrate, about 2.0 cc. are clear oil and about 0.5 cc. are an emulsion of water in oil. It will be noted that if the aqueous phase is maintained within the range of 50 to 69 per cent by volume, no emulsion is present in the filtrate. That is, the filtrate is all oil, which cannot possibly cause water contamination of oil-bearing zones.

*Salt content*

I have found that the presence of salt, such as sodium chloride has a stabilizing effect on emulsions prepared according to my invention. The stabilizing effect is particularly noticeable when low concentrations of the water-soluble emulsifying agents are employed. With larger concentrations of the water-soluble emulsifier of the order of two or three pounds per barrel, the emulsion is stable even when fresh water is employed. Use of salt in my emulsion drilling fluid is not, therefore, essential. Salt has certain additional advantages, however, which makes its use highly desirable. For example, if the water phase is approximately saturated with sodium chloride or some other salt, shale hydration by the brine is practically eliminated even though the shale particles manage to penetrate the continuous oil phase. Thus, contamination of the drilling fluid with hydrated shale is avoided. If the water concentration in the emulsion is in the range which produces an emulsion filtrate, the presence of salt in the filtrate water will also aid in decreasing hydration of shale in the formation. Another advantage of the salt content of the water phase is that the salt reduces somewhat, the surface tension of the water phase. This probably explains the stabilizing effect on the emulsion. Still another advantage of employing a brine water phase is that if a brine is employed in the emulsion, then brine contamination of the emulsion can have little effect on the emulsion properties.

The use of sodium chloride has been specifically mentioned. Other salts, such as the chlorides of potassium, calcium, barium, strontium and magnesium or the nitrates, or other water-soluble salts of these metals may be employed. In general, water-soluble salts of the alkali metals and alkaline earth metals have been found to be satisfactory. If a salt is to be employed in the water phase, an amount equal to at least about 5 per cent by weight of the water phase should be used. Smaller amounts, of course, can be employed but very little effect is produced until about 5 per cent by weight of the salt is present. Preferably, the aqueous phase should be substantially saturated with the salt. In order to maintain the aqueous phase in a saturated condition, I have found it convenient to maintain solid salt in contact with the drilling fluid in the mud pits or tanks. A final advantage of the presence of salts in the aqueous phase which should not be ignored, is that by employing saturated salt solutions, the density of that phase can be increased by approximately 20 per cent.

*Oil phase*

The range of oil phase concentration has already been indicated indirectly in the discussion of the water phase. Oil is simply employed in an amount necessary to make the difference between the per cent of water employed and 100 per cent. Regarding the nature of the oil, it has been found that a refined hydrocarbon oil is preferable to crude mineral oil although most crudes are operable in the preparation of my emulsion drilling fluids. The use of No. 2 fuel oil has been found to be particularly desirable since it is a relatively heavy oil without light ends but is still sufficiently low in viscosity so that if the oil is lost as filtrate into the formation, it can flow out again easily when the well is put into production. The use of a refined oil permits control of the external phase of the emulsion which governs many of the emulsion properties. For example, the presence of unknown emulsifiers which often occur in crude oils is avoided. The use of a refined oil also results in a cleaner appearing mud, due to the absence of natural asphalts and other bituminous materials, and the like. However, a drilling fluid prepared with most crudes is fairly light in color and unobjectionable to work with. Although emulsions prepared with inflammable hydrocarbons has been found to present very little fire hazard, due to the presence of large volumes of the water phase, fire dangers can be further reduced by the selection of refined oil fractions having low flash points. Although mineral oils, and particularly refined hydrocarbon fractions are preferred, other oils such as turpentine, cotton-seed oil, whale oil, or other animal or vegetable oils may also be used.

*Oil-soluble emulsifier*

In general, the principal emulsifier should be oil-soluble in order to insure the formation of a water-in-oil emulsion. The use of relatively non-ionic emulsifiers has been found to be highly important since these emulsifiers depend, for their emulsifying effect, more on surface-active properties of the materials themselves rather than upon any tendency of one portion of the molecule to ionize in the water phase. Although the emulsifier should have some hydrophilic properties, these properties should be slight to insure that the principal emulsifier remains in the oil phase whereby the formation of a water-in-oil type emulsion is insured.

Although the term "oil-soluble" is employed, I have found that there is a very indistinct line of demarcation between materials which are oil-soluble and those which are oil-dispersible. When the term "oil-soluble" is employed hereinafter, it should be understood that I intend to include materials which are sufficiently oil-dispersible to permit maintaining the desired concentration of dissolved or dispersed emulsifier permanently in the oil phase. According to some authors, water-in-oil emulsions are characterized by a relatively solid or plastic film around the water droplets (Surface Active Agents by Schwartz and Perry; Interscience Publishers, Inc.; New York, 1949, p. 348). If this is true, then the use of oil-dispersible solid emulsifiers might have some advantages over the use of oil-soluble materials.

In practice, I have found that the esters of polyhydric alcohols are satisfactory for my purposes so long as they are oil-soluble, relatively non-ionic and contain at least one, and preferably two water-soluble groups, such as hydroxyl groups, to cause concentration of the material at oil-water interfaces. Examples of polyhydric alcohols which are satisfactory for forming an emulsifier are: ethylene glycol, polyethlyene glycols, glycerol, tetrahydric alcohols, such as erythritol, pentahydric alcohols, such as arabitol and xylitol, hexahydric alcohols, such as sorbitol and mannitol, and polyhydric alcohols containing more than six hydroxyl groups. The class of suitable polyhydric alcohols also includes their anhydro derivatives in which water has been removed from two hydroxyl groups to form a cyclic ether of the polyhydric alcohol. These anhydro derivatives can be formed from polyhydric alcohols containing a chain of at least four carbon atoms, with a hydroxyl group attached to each carbon atom. Another group of suitable polyhydric alcohols comprises the monosaccharides; such as sorbose, mannose, glucose, arabinose, xylose, erythrose and glyceraldehyde, although the last two frequently are not referred to as monosaccarides. Other polyhydric alcohols, such as pentaerythritol may also be esterified to produce suitable emulsifying agents for my purposes.

Esterification of one hydroxyl group with a fatty acid containing at least twelve carbon atoms, is usually sufficient to impart enough oil solubility to cause formation of a water-in-oil emulsion, although esterification of at least two hydroxyl groups is usually advisable. As example of suitable acids, there may be mentioned lauric, oleic, stearic and palmitic acids.

Particularly in the case of the hexahydric and pentahydric alcohols, the unesterified hydroxyl groups will lend sufficient water solubility to cause segregation of the materials at oil-water interfaces and insure formation of stable emulsions. Increase in water solubility may be achieved in the case of the higher molecular weight polyhydric alcohols by dehydration to form cyclic ethers having five or six membered rings as described, for example in 2,322,820 and 2,322,821 Brown. In some cases, other polar groups, such as the phosphorous or nitrogen groups in lecithin may possess sufficient water solubility to impart definite surface-active and emulsifying properties to the esters. If still further water solubility is desired, a polyoxyethylene chain may be attached through an ether linkage with one of the remaining hydroxyl groups to produce greater hydrophilic properties in the molecule. The hydrophilic properties can be adjusted by varying either the number or the length of the polyoxyethylene chains. In general, one or more chains containing a total, in all chains, of about 4 oxyethylene groups, will impart sufficient water solubility even when 3 or 4 of the hydroxyl groups have been esterified. Addition of more than 4 oxyethylene groups is undesirable bcause the water-solubility becomes too great, resulting in a tendency of the emulsion to invert. It will be apparent that other oxyalkylene groups such as oxypropylene can also be employed.

The above described emulsifiers are oil-soluble and are also non-ionic. The term "non-ionic" is a somewhat indefinite term as applied to emulsifiers. For the purposes of this invention, the expression should be interpreted to mean those emulsifiers which are substantially unaffected by the brines described under the heading "Salt content." Thus, while lecithin and cephalin theoretically are slightly ionized, they should be considered as members of the group classsified as "non-ionic" for purposes of this invention, since they are substantially unaffected by brines.

Table I shows some of the properties of emulsion drilling fluids prepared using various of the oil-soluble, surface-active agents falling within the class just described. The emulsions were prepared using 60 volume per cent of saturated salt water, 40 volume per cent of No. 2 fuel oil, 20 pounds per barrel of ground limestone and 8 pounds per barrel of the named surface-active agent.

TABLE I

| Emulsifier | Type Emulsion | Stormer Viscosity | Stormer, 10 Min. | Fluid Loss, cc./30 Min. |
|---|---|---|---|---|
| Span 80 | Water-in-oil | 74 | 0 | 2.3 Water-in-oil emulsion. |
| Pentamull 126 | do | 102 | 4 | 2.0 1.5 Oil, 0.5 emulsion. |
| Lecithin | do | 100 | 4 | 1.1 Oil. |
| Emulphor A G | do | 37 | 0 | 17.0 Water-in-oil emulsion. |

In the above table, certain of the emulsifiers employed are identified by their trade-marks. Span 80 is anhydrosorbitol monooleate. Pentamull 126 is the mono ester of oleic acid and penerythritol. Emulphor AG is described as a polyglycol ester of long chain fatty acids.

The fluid loss shown in Table I was obtained by the process and apparatus set forth in A. P. I. Code No. 29, second edition, July 1942 (tentative).

Of the oil-soluble, non-ionic emulsifying materials described, I have found that the phosphatides such as lecithin are particularly advantageous, since in certain concentration ranges, they produce a drilling fluid which has an oil filtrate. All other emulsifiers mentioned produce an emulsion filtrate. In the presence of the water-soluble emulsifying agent, this emulsion filtrate has been found to be stable so that the shales are protected by the continuous oil phase. It is a desirable feature of the phosphatides, however, that all possible danger of water contamination of the formation can be eliminated. Another advantage of the phosphatides, such as lecithin, is that in the presence of the water-soluble emulsifying agent, an extremely low filtrate rate of almost zero is produced. The other emulsifying agents also produce emulsions with filtrate rates in the range of 1 or 2 cc. by the standard A. P. I. test. Again, however, the phosphatides are somewhat superior to the other embodiments of oil-soluble emulsifiers.

When the terms "phosphatides" and "lecithin" are employed, it will be understood that reference is usually made to commercial lecithin. This material actually contains approximately equal quantities of lecithin and cephalin dissolved in soy bean oil. The phosphatides make up about 60 to 65 per cent and the soy bean oil about 35 to 40 per cent of the mixture. Such interpretation, however, is in no way intended to limit the scope of the accompanying claims inasmuch as the pure compounds as well as the commercial grades thereof can be employed in carrying out my invention.

In Figure 2, curve A shows variations of viscosity with changes in concentration of the oil-soluble emulsifier, commercial lecithin being employed as the preferred example of these materials. Curves B and C both show the fluid loss properties of the emulsion. Curve B indicates the total fluid loss of the emulsion and curve C shows the portion of the filtrate which is emulsion. For example, when 6 pounds of commercial lecithin are employed per barrel of emulsion, the total fluid loss is slightly less than 2.0 cc./30 min. Of this amount, about 1.5 cc. is clear oil, while about 0.4 cc. consists of a water-in-oil emulsion.

As illustrated in Figure 2, the concentration of the oil-soluble emulsifier should be above about 2.5 pounds per barrel of emulsion (4 pounds of commercial lecithin per barrel) in order to reduce the filtrate rate of the basic emulsion to a reasonably low value prior to the addition of water-soluble emulsifier. A preferable minimum amount of the oil-soluble emulsifier, particularly in the case of phosphatides, is about 5 pounds per barrel of emulsion (8 pounds of commercial lecithin per barrel) since, as shown in Figure 2, this amount of phosphatides results in the formation of an all-oil filtrate. The upper limit of concentration of the oil-soluble emulsifier is controlled principally by viscosity considerations. Concentrations in the range of 10 pounds per barrel (14 pounds of commercial lecithin per barrel) should not be greatly exceeded in order to avoid high viscosity problems.

*Water-soluble emulsifier*

All non-ionic, water-soluble, surface-active agents tested were found to be satisfactory to stabilize water-in-oil emulsions containing non-ionic, oil-soluble emulsifiers as emulsifying agents. Examples of materials which have been tested are presented in Table II.

TABLE II

| Trade Mark | Chemical Description |
|---|---|
| Neutronyx 600 | Anhydrous aromatic polyglycol ether. |
| Igepol | Alkyl aryl polyethylene glycol. |
| Introl 224 | Long chain fatty acid ester containing multiple ether linkages. |
| Sterox CD | Polyoxyethylene ester. |
| Sterox SK and SE | Polyoxyethylene thioethers. |
| Triton X-100 | Alkyl aryl polyether alcohols. |
| Nonic 218 | Polyethylene glycol tertdodecyl thio-esters. |
| Tween 80 | Polyoxyethylene sorbitan monooleate. |
| Renex | Polyoxyethylene mixed esters of fatty and resin acids. |

In general, these materials are formed from high molecular weight alcohols, mercaptans, or acids (usually carboxylic) by attaching the alcohol, mercaptan or acid to a polyoxyalkylene chain such as a polyoxyethylene or a polyoxypropylene chain of the appropriate length. The attachment is made through an ether linkage in the case of the alcohol or mercaptan (thioether linkage) and through an ester linkage in the case of the acid. Use of either cationic or anionic water-soluble emulsifiers has been found to cause inversion of the emulsion to an oil-in-water form.

The alcohol, mercaptan, or acid portion of the non-ionic, water-soluble emulsifier should contain at least 12 and not more than 20 carbon atoms per molecule. If the hydrophobic portion of the emulsifier contains less than 12 carbon atoms per molecule, the emulsifier will not be sufficiently oleophilic or lipophilic to insure diffusion through the oil phase of the emulsion and concentration at the oil-water interface. If the hydrophobic portion contains more than about 20 carbon atoms, an excessive amount of ethylene oxide groups must be employed to induce sufficient water solubility to insure a stabilizing effect on the emulsion. The carbon atoms may be arranged in a straight chain or may be in other forms such as an alkylated aromatic ring. While suitable water-soluble emulsifiers are known which contain more than one hydrophobic group, such as Tween 85, the type containing only one such group is greatly preferred as the water-soluble emulsifier.

The polyoxyethylene portion of the water-soluble emulsifier should consist of one or more chains containing a total in all chains of between 6 and 30 oxyethylene groups. Emulsifiers containing only 6 oxyethylene groups, such as Tween 81, are not as effective as might be desired since they are only water-dispersible and not really water-soluble. While such emulsifiers are operable, it is much preferred to employ those containing a total of at least 10 oxyethylene groups in all the polyoxyethylene chains. After the addition of 30 oxyethylene groups, further addition of these groups is relatively ineffective to impart further water solubility to the emulsifier. Accordingly, this amount is rarely exceeded. So far as is known, all the materials listed in Table II fall within the limits set forth above. Certainly, Sterox CD and Tween 80 fall within the limits.

The water-soluble emulsifier should be used in concentrations of at least 0.1 pound per barrel of emulsion. As illustrated in Table III, the use of 1 pound of the water-soluble emulsifier per barrel permits contamination with 30 per cent natural mud without destroying the properties of the drilling fluid. The emulsion containing only 1 per cent of the water-soluble emulsifier will not, however, withstand 50 per cent contamination by natural mud. As indicated by curve A in Figure 3, the use of about 0.1 pound per barrel of Sterox produces a noticeable decrease in viscosity of the emulsion drilling fluid. However, this small amount of Sterox will not permit any considerable contamination with natural muds. Therefore, more than 0.1 pound per barrel of the water-soluble emulsifier is generally added. About 3 pounds per barrel are usually added to reduce the fluid loss to nearly zero as shown by curve B in Figure 3. Table III also indicates that as soon as about 3 pounds per barrel of the water-soluble emulsifier have been added, addition of further amounts produces little effect. Therefore, more than 5 pounds per barrel of the water-soluble emulsifier is rarely added.

TABLE III

| Mud Composition | Stormer Viscosity Cpse. | Stormer 10 Min. Gel Strength | Fluid Loss, 30 Min. | Remarks |
|---|---|---|---|---|
| 40% fuel oil, 60% salt water, 8 lb./bbl. lecithin, 20 lb./bbl. ground limestone. | 100 | 5 | 1.1 cc. Oil | |
| (1) Added to base mud 1 lb./bbl. Sterox CD | 73 | 4 | 0.6 cc Oil | |
| (a) Plus 30% natural mud containing bit cuttings. | 105 | 10 | 0 | |
| (b) Plus 50% mud | 30 O/W | 24 | 40 Water | Emulsion inverted to O/W type. |
| (2) Added to base mud 3 lb./bbl. Sterox CD | 73 | 4 | 0 | |
| (a) Plus 30% natural mud | 105 | 8 | 0 | |
| (b) Plus 50% natural mud | 205 | 17 | 0 | Emuslion remained W/O type. |
| (c) Plus 50% natural mud and 10% fuel oil | 150 | 11 | 0 | Fuel oil reduced viscosity. |
| (3) Added to base mud 5 lb./bbl. Sterox CD | 74 | 4 | 0 | |
| (a) Plus 30% natural mud | 110 | 8 | 0 | |
| (b) Plus 50% natural mud | 220 | 23 | 0 | Emulsion remained W/O type. |
| (c) Plus 50% natural mud and 10% fuel oil | 110 | 5 | 0 | Fuel oil reduced viscosity. |

The data in Table III indicate one method for increasing the volume of drilling fluid if desired. That is, the emulsion can be diluted with water, more water-soluble emulsifier can be added and then additional oil, containing an appropriate amount of oil-soluble emulsifier, can be added to bring the water-to-oil ratio and the emulsifier concentrations back into the preferred ranges. Any variations of the order of addition can be employed, but the order of addition which is preferred, because it avoids all possible difficulties, is to add the oil and oil-soluble emulsifier first, then add the water and any solids desired, and finally to add the water-soluble emulsifier. This procedure also has the advantage of causing the water-soluble emulsifier to approach the oil-water interface from the oil side, an advantage which has previously been discussed.

*Solids*

As noted above, the emulsion should preferably contain a certain amount of solids. These solids function in the emulsion to increase viscosity and to afford plastering properties to the drilling fluid. Although the presence of solids in the emulsion is highly desirable initially, it should be pointed out that the emulsion drilling fluid is operable without the solids, and that a certain solids content will develop after a period of drilling. Since the drilling fluid so effectively prevents shale contamination, however, the normal practice is to add an amount of solids equal to at least 5 pounds per barrel, and preferably about 20 pounds per barrel to the emulsion. Suitable materials tested to date are bentonite, ground limestone, barites and work-over clay. All these materials should be ground until about 90 per cent passes a 325 mesh screen. Of the materials tested, ground limestone and bentonite have been found to be preferable.

My invention will be more fully understood by reference to the following specific examples:

*Example I*

A drilling fluid was prepared according to this invention and was employed to complete a well in Beaver Creek Field, Wyoming. The well was drilled to 3,515 feet using a water-base mud. Thereafter, it was cored with a small core drill to 3,540 feet using the same water-base mud. Casing was set at 3,515 feet and cemented. At this point the water-in-oil emulsion mud was prepared. Steel mud pits were available at the well. Two of these with a capacity of 175 barrels each, were cleaned and a total of 240 barrels of water were added together with 24,000 pounds of sodium chloride. The water was circulated, by means of the rig pumps, through mud guns in the pits, until the water was saturated with salt. Considerable solid salt remained in the pits. The water was pumped out to storage. In the same pits containing no water but with excess salt still present, 120 barrels of No. 2 fuel oil were introduced together with 2,400 pounds of commercial lecithin. Again, solution was obtained by circulation through the mud pumps and the mud guns in the pits. When the lecithin was dissolved, 180 barrels of the saturated salt water was transferred to the mud pits, and circulation through the mud guns continued until the emulsion was well mixed. Next, 38,400 pounds of ground limestone were added by means of a hopper and jet, and circulation continued until the limestone was thoroughly mixed into the emulsion. Finally, 900 pounds of Sterox CD were added slowly while mixing continued. A total mud volume of 345 barrels resulted.

Approximately 16 hours of rig time were required to mix the emulsion, due to the very cold weather prevailing at the time. In spite of the cold weather, the mud mixed satisfactorily, and had desirable properties as follows:

Stormer viscosity _____ 70–80 cpse.
Marsh funnel viscosity _____ 75–80 sec.
Weight _____ 9.9 lb./gal.
Gel strength _____ 0–5 grams
A. P. I. fluid loss _____ Less than 1 cc./30 min.
Color _____ Neutral The water-base mud was circulated out of the well using fresh water. The fresh water was followed by a "plug" or "spacer" consisting of 30 barrels of saturated salt water to prevent excessive mixing of the fresh water with the emulsion drilling fluid which was pumped in after the plug or spacer. As soon as the emulsion returned to the surface outside the drill pipe, drilling operations were started by drilling out the cement plug and reaming the hole from 3,515 to 3,540 feet. The well was then drilled into the oil-producing Mesa Verde zone by coring for 100 feet at a rate of about one foot every ten minutes. The Marsh-funnel viscosity rose to 145 seconds. The mud was treated back to a 95 second viscosity by the addition of about 450 pounds of Sterox CD and 20 barrels of No. 2 fuel oil. Again the viscosity rose to about 125 seconds, but levelled off and remained at this value for the remaining period, approximately 15 hours, of the drilling operations. Properties of the mud at the end of the drilling operation were as follows:

Marsh funnel viscosity _____ 125 sec.
Weight _____ 9.9 lb./gal.
A. P. I. fluid loss _____ Zero
Color _____ Slightly darker than at first.

None of the usual precautions such as drip pans and oil savers normally used with oil-base muds were employed, the drilling crews reporting that they found the mud to be no more objectionable than ordinary water-base muds.

When tested through an 18/64" choke, the well flowed 200 barrels of oil in 6 hours. This is considerably superior to comparable wells completed with water-base, oil-base and oil-in-water emulsion muds. The water-in-oil emulsion mud was stored for further completions in this field in view of its successful use.

Cores taken from this well were compared to those taken from another Beaver Creek well completed in the Mesa Verde which was cored from 3,521 to 3,630 feet using an oil-base mud. The cores drilled with the emulsion-base mud had a water saturation of 42.21 per cent and an oil saturation of 13.1 per cent. Those drilled with the oil-base mud had a water saturation of 44.4 per cent and an oil saturation of 15.7 per cent. This data illustrates that the ability of the emulsion drilling fluid to prevent water contamination is comparable to that of a straight oil-base mud.

In order to check further the apparent zero fluid loss of the emulsion as indicated by the standard A. P. I. test, a core drilled with the emulsion mud was dried and extracted to remove all liquids. The dry core was then exposed to the emulsion drilling fluid and a differential pressure of 100 p. s. i. was applied for 30 minutes in an attempt to force the fluid through the core. No visible penetration could be observed, so the core was distilled and no water was recovered. This again illustrates the protection against water-contamination afforded by my emulsion drilling fluid.

*Example II*

An emulsion drilling fluid was prepared in the laboratory, according to my invention, containing 60 parts by volume of an aqueous saturated sodium chloride solution, 40 parts by volume of No. 2 fuel oil, 8 pounds per barrel of commercial lecithin, 20 pounds per barrel of limestone ground to pass a 325 mesh screen, and 3 pounds per barrel of Tween 80, a polyoxyethylene anhydrosorbitol monooleate containing approximately 20 oxyethylene groups per molecule. The lecithin was dissolved in the oil and the salt water was then poured in while the mixture was agitated. As soon as the aqueous phase was thoroughly dispersed in the oil, the ground limestone was added and stirred into the mixture. Finally, the Tween 80 was added and stirred in by means of a mechanical mixer. A water-in-oil emulsion drilling fluid resulted which had the following properties:

Viscosity _____ 40 cpse.
Initial gel strength _____ 2 grams, stormer
10 minute gel strength _____ 5 grams, stormer
Fluid loss _____ 0.4 cc./30 min.

This emulsion drilling fluid was contaminated with 30 per cent by volume of a natural water-base mud. Another sample was contaminated with 50 per cent of the mud. The properties of the resulting contaminated drilling fluids were as follows:

|  | 30% Contamination | 50% Contamination |
| --- | --- | --- |
| Viscosity, Cpse | 40 | 40 |
| Initial gel strength, grams stormer | 1 | 1 |
| 10 Minute gel strength, grams stormer | 1 | 1 |
| Fluid lost, cc./30 Min | 0.0 | 0.0 |

It will be understood that while specific examples and theories have been presented, I do not wish to be limited by these examples and theories. My invention should, rather, be limited only by the claims.

I claim:

1. A stable water-in-oil emulsion drilling fluid comprising from about 40 to about 75 parts by volume of water, and from about 25 to about 60 parts by volume of oil, said emulsion drilling fluid containing at least 2.5 pounds per barrel of an oil-soluble, non-ionic, surface-active ester of a polyhydric alcohol with an acid having at least twelve carbon atoms to the molecule and said emulsion drilling fluid also containing at least 0.1 pound per barrel of a water-soluble, non-ionic, surface-active agent.

2. A stable water-in-oil emulsion drilling fluid comprising from about 40 to about 75 parts by volume of water, and from about 25 to about 60 parts by volume of oil, said emulsion drilling fluid containing at least 2.5 pounds per barrel of an oil-soluble, non-ionic, surface-active partial ester of a polyhydric alcohol with a carboxylic acid having at least twelve carbon atoms per molecule, and said emulsion drilling fluid also containing at least 0.1 pound per barrel of a water-soluble, non-ionic, surface-active agent.

3. A stable water-in-oil emulsion drilling fluid comprising from about 40 to about 75 parts by volume of water, and from about 25 to about 60 parts by volume of oil, said emulsion drilling fluid containing at least 2.5 pounds of a phosphatide per barrel of emulsion, and said emulsion drilling fluid also containing at least 0.1 pound of a water-soluble, non-ionic, surface-active agent per barrel of emulsion.

4. The drilling fluid of claim 3 in which said oil is a refined petroleum fraction, and said water-soluble, non-ionic, surface-active agent is an ester of a carboxylic acid and a polyoxyalkylene chain, said acid having from about 12 to about 20 carbon atoms per molecule, and said polyoxyalkylene chain having from about 10 to about 30 oxyalkylene groups.

5. The drilling fluid of claim 3 in which said oil is a refined petroleum fraction and said water-soluble, non-ionic, surface-active agent is a polyoxyethylene anhydrosorbitol monooleate containing about 20 oxyethylene groups per molecule.

6. The drilling fluid of claim 3 in which said oil is a refined petroleum fraction and said phosphatide is lecithin.

7. A water-in-oil emulsion drilling fluid comcomprising from about 40 to about 75 parts by volume of an aqueous salt solution wherein said solution contains at least about 5 per cent of a salt of a metal selected from the group consisting of alkali metals and alkaline earth metals, and from about 25 to about 60 parts by volume of oil; said emulsion drilling fluid containing at least 2.5 pounds per barerl of an oil-soluble, non-ionic, surface-active ester formed from a polyhydric alcohol and an acid having at least twelve carbon atoms per molecule; said emulsion drilling fluid containing at least 0.1 pound of a water-soluble, non-ionic, surface-active agent per barrel of emulsion; and said emulsion drilling fluid containing at least 5 pounds per barrel of solids having a particle size smaller than 325 mesh.

8. A water-in-oil emulsion drilling fluid comprising from about 40 to about 75 parts by volume of water, containing from 5 per cent to saturation per cent of at least one salt of a metal selected from the group consisting of alkali metals and alkaline earth metals, and from about 25 to about 60 parts by volume of oil; said emulsion drilling fluid containing per barrel of emulsion at least 2.5 pounds of at least one phosphatide, at least 0.1 pound of a water-soluble, non-ionic, surface-active agent, and at least 5 pounds of solids of a particle size smaller than 325 mesh.

9. The drilling fluid of claim 8 in which said oil is a refined petroleum fraction, and said water-soluble, non-ionic, surface-active agent is an ester of a carboxylic acid and a polyoxyalkylene chain; said acid having from about 12 to about 20 carbon atoms per molecule, and said polyoxyalkylene chain having from about 10 to about 30 oxyalkylene groups.

10. A method for preparing a water-in-oil emulsion drilling fluid comprising dissolving an oil-soluble, non-ionic, surface-active agent in oil, emulsifying said oil with an aqueous phase, and finally adding a water-soluble, non-ionic, surface-active agent.

11. A method of servicing a well comprising circulating in said well a water-in-oil emulsion drilling fluid containing from about 40 to about 75 parts by volume of water, and from about 25 to about 60 parts by volume of oil, said emulsion drilling fluid containing at least 2.5 pounds per barrel of an oil-soluble, non-ionic, surface-active ester formed from a polyhydric alcohol and an acid having at least twelve carbon atoms to the molecule and said emulsion drilling fluid also containing at least 0.1 pound per barrel of a water-soluble, non-ionic, surface-active agent.

12. A method of servicing a well comprising circulating in said well a water-in-oil emulsion drilling fluid containing from about 40 to about 75 parts by volume of water, and from about 25 to about 60 parts by volume of oil, said emulsion drilling fluid containing at least 2.5 pounds of at least 1 phosphatide per barrel of emulsion, and said emulsion drilling fluid also containing at least 0.1 pound of a water-soluble, non-ionic, surface-active agent per barrel of emulsion.

13. The method of claim 12 in which said oil is a refined petroleum fraction and said water-soluble, non-ionic, surface-active agent is a polyoxyethylene anhydrosorbitol monooleate containing about 20 oxyethylene groups per molecule.

14. A method of servicing a well comprising circulating in said well a water-in-oil emulsion drilling fluid containing from about 40 to about 75 parts by volume of an aqueous salt solution wherein said solution contains at least about 5 per cent of a salt of a metal selected from the group consisting of alkali metals and alkaline earth metals, and from about 25 to about 60 parts by volume, of oil; said emulsion drilling fluid containing at least 2.5 pounds per barrel of an oil-soluble, non-ionic, surface-active ester of a polyhydric alcohol with an acid having at least twelve carbon atoms per molecule; said emulsion drilling fluid containing at least 0.1 pound of a water-soluble, non-ionic, surface-active agent per barrel of emulsion; and said emulsion drilling fluid containing at least 5 pounds per barrel of solids of a particle size smaller than 325 mesh.

15. A method of servicing a well comprising circulating in said well, a water-in-oil emulsion drilling fluid containing from about 40 to about 75 parts by volume of an aqueous salt solution wherein said solution contains at least about 5 per cent of a salt of a metal selected from the group consisting of alkali metals and alkaline earth metals, and from about 25 to about 60 parts by volume of oil; said emulsion drilling fluid containing per barrel of emulsion at least 2.5 pounds of at least 1 phosphatide, at least 0.1 pound of a water-soluble, non-ionic, surface-active agent, and at least 5 pounds of solids of a particle size smaller than 325 mesh.

16. The method of claim 14 in which said oil is a refined petroleum fraction and said water-soluble, non-ionic, surface-active agent is an ester of a carboxylic acid and a polyoxyalkylene chain; said acid having from about 12 to about 20 carbon atoms per molecule, and said polyoxyalkylene chain having from about 10 to about 30 oxyalyklene groups.

JAMES LAWSON LUMMUS.

References Cited in the file of this patent

UNITED STATES PATENTS

| Number | Name | Date |
|---|---|---|
| 2,099,825 | Rolshausen et al. | Nov. 23, 1937 |
| 2,151,029 | Henst | Mar. 21, 1939 |
| 2,497,398 | Dawson | Feb. 14, 1950 |
| 2,542,019 | Fischer | Feb. 20, 1951 |
| 2,582,323 | Fischer | Jan. 15, 1952 |